US 7,966,568 B2

(12) United States Patent
Kim

(10) Patent No.: US 7,966,568 B2
(45) Date of Patent: Jun. 21, 2011

(54) REMOTE CONTROL METHOD HAVING GUI FUNCTION, AND SYSTEM USING THE SAME

(75) Inventor: Jeong Hyun Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/621,981

(22) Filed: Jan. 10, 2007

(65) Prior Publication Data

US 2007/0106945 A1    May 10, 2007

Related U.S. Application Data

(63) Continuation of application No. 10/268,187, filed on Oct. 10, 2002, now Pat. No. 7,174,518.

(30) Foreign Application Priority Data

Oct. 11, 2001    (KR) .................................. 2001-62645

(51) Int. Cl.
G06F 3/048    (2006.01)
G06F 3/041    (2006.01)
H04N 7/00    (2011.01)

(52) U.S. Cl. ........ 715/764; 715/864; 348/114; 348/734; 345/173

(58) Field of Classification Search .................. 715/716, 715/719, 864, 810, 735, 762–764; 345/168, 345/173, 156; 348/734, 114

See application file for complete search history.

(56) References Cited

U.S. PATENT DOCUMENTS

| 4,959,721 | A | * | 9/1990 | Micic et al. ................... 348/734 |
| 5,410,326 | A | * | 4/1995 | Goldstein ...................... 348/734 |
| 5,598,523 | A | * | 1/1997 | Fujita ............................ 715/840 |
| 6,262,717 | B1 | * | 7/2001 | Donohue et al. .............. 345/173 |
| 6,396,523 | B1 | * | 5/2002 | Segal et al. .................... 715/863 |
| 6,407,779 | B1 | * | 6/2002 | Herz ............................. 348/734 |
| 6,437,836 | B1 | * | 8/2002 | Huang et al. .................. 341/176 |
| 6,750,803 | B2 | * | 6/2004 | Yates et al. .................... 341/176 |
| 6,765,557 | B1 | * | 7/2004 | Segal et al. .................... 345/173 |
| 6,861,961 | B2 | * | 3/2005 | Sandbach et al. .............. 341/22 |
| 6,944,472 | B1 | * | 9/2005 | Ishigami .................... 455/550.1 |
| 2001/0017615 | A1 | * | 8/2001 | Lin et al. ....................... 345/173 |
| 2002/0108124 | A1 | * | 8/2002 | Sato .............................. 725/136 |
| 2002/0118131 | A1 | * | 8/2002 | Yates et al. .................... 341/176 |
| 2003/0149988 | A1 | | 8/2003 | Ellis et al. |

* cited by examiner

*Primary Examiner* — Tadeese Hailu
(74) *Attorney, Agent, or Firm* — KED & Associates LLP

(57) ABSTRACT

A remote control method and system embody a graphic user interface. The present invention includes a remote controller having a touch pad and a digital television having a GUI. That is, a viewer can select a menu displayed on the digital television by using the touch pad. It is thus possible to overcome control limitations of the remote controller, namely complexity of the rapidly-developed functions of the television. In addition, the viewer can watch menus displayed on the screen of the digital television, operate the touch pad and execute a wanted control operation. As a result, the viewer can easily conveniently control the digital television through simple operations of the remote controller.

18 Claims, 6 Drawing Sheets

| Friday | 7:30 PM | 8:00 PM | 8:30 PM |
|---|---|---|---|
| MBC | ◄ | Let's praise | ► |
| KBS | ◄ Wanggun | Relay of Entertainment world | |
| SBS | ◄ Paradise of Curiosity | News | ► |
| iTV | ◄ News | | Gag concert |
| DCN | ◄ | Movie | ► |
| ⋮ | ⋮ | ⋮ | |

REMOTE CONTROL METHOD HAVING GUI FUNCTION, AND SYSTEM USING THE SAME

This application is a continuation of U.S. application Ser. No. 10/268,187, filed on Oct. 10, 2002 now U.S. Pat. No. 7,174,518, which claims the benefit of earlier filing date and right of priority to Korean Application No. 2001-0062645, filed on Oct. 11, 2001, the contents of which are hereby incorporated by reference herein in its entirety.

BACKGROUND OF THE INVENTION

1. Field of the Invention

The present invention relates to a remote control method and system, which can provide a digital television for embodying a user-friendly GUI environment by using a remote controller having a touch pad.

2. Background of the Related Art

Recently, a lot of viewers have been fascinated by a television due to visual attraction of the television which is an image medium for transmitting image information including a variety of contents.

In addition, an increasing number of viewers use a video cassette recorder (VCR) which stores image information in a magnetic tape and allows the viewers to repeatedly watch it in a wanted time.

A digital television taking advantages of the television and VCR have been rapidly spread. Differently from the VCR which stores image information in the magnetic tape, the digital television includes a next generation recording device for installing a hard disk drive (HDD) in a settop box or television body, and storing a real-time broadcasting program of the television in the HDD. Therefore, the viewers can watch the broadcasting program stored in the HDD anytime, and also can edit it to create their own programs.

The digital television includes a CPU for controlling the whole television, a ROM for storing an operating system and a playback software, and an HDD which is a large capacity storing medium.

In basic functions, the digital television which temporarily stores a program from a broadcasting station and replays it later is not that different from the general VCR. However, since the digital television uses the HDD instead of the magnetic tape, it removes deformation of the magnetic tape and easily detects and edits a wanted part.

In addition, the digital television is linked to an electronic program guide (EPD) function for frequently receiving a recent schedule of broadcasting programs and reservation-recording wanted program. In the reservation recording, the viewer can easily operate the television merely by selecting a wanted menu of the broadcasting menus displayed on the screen. Moreover, the digital television can simultaneously record a few programs, instantaneously stop a live program, or repeatedly replay a previous scene.

The digital television basically supports a replay function and is linked to broadcasting service companies for allowing the viewers to interactively watch programs.

As described above, the digital television is added with a variety of functions for providing lots of information to the viewers.

However, key operations for controlling each function are too complicated for young or aged people to conveniently use the digital television.

FIG. 1 illustrates a conventional remote controller including number keys and menu keys. Referring to FIG. 1, the conventional remote controller has a restricted number of menu keys due to its limited size. Therefore, in order to perform control operations for complicated functions of the digital television, the same menu key is pressed several times.

That is, complicated key operations are essential to execute an increasing number of functions of the digital television. As a result, the remote controller cannot cope with difficult control operations of the general digital television or other image media.

Especially, the digital television needs frequent interactive controls of the viewers. Such complicated key operations prevent the viewers from using the functions of the digital television.

SUMMARY OF THE INVENTION

An object of the invention is to solve at least the above problems and/or disadvantages and to provide at least the advantages described hereinafter.

Accordingly, one object of the present invention is to solve the foregoing problems by providing a remote control method and system which embodies a graphic user interface.

Another object of the present invention is to provide a remote controller including a touch pad for controlling a graphic user interface.

The foregoing and other objects and advantages are achieved by providing a remote control method including a GUI function which includes: transmitting at a remote control means, a touch pad signal mode set up by a button key operation of a viewer to an image display means; displaying, at the image display means, menu selection information in a window type in a GUI environment according to the touch pad signal mode; transmitting, at the remote control means, a touch control signal generated by a touch pad contact of the viewer to the image display means; and executing, at the image display means, the displayed menu selection information according to the touch control signal.

The remote control method including the GUI function further includes a step for the image display means to distinguish the touch pad signal mode and button signal mode received from the remote control means, and supply them to a corresponding control unit.

The menu selection information includes a main manual for allowing the viewer to select a menu and a pointer for designating the menu selected by the viewer.

The touch control signal is a movement position signal having movement distance/direction information of the pointer generated when the viewer moves by a predetermined distance in a state where he/she maintains a first contact position to the touch pad.

In addition, the touch control signal is a menu selection signal generated when the viewer maintains the first contact position to the touch pad over a predetermined time, or when he/she continuously contacts the first position to the touch pad.

According to another aspect of the invention, a remote control system including a GUI function includes a remote control means having a button processing unit for generating a button signal in response to a button key press of a viewer; a touch pad control unit for generating a touch control signal in response to a touch pad contact of the viewer; and a signal transmitting unit for remotely transmitting the signals from the button processing unit or touch pad control unit, and an image display means having a signal receiving unit for receiving the signals from the signal transmitting unit; a signal control unit for receiving the signals from the signal receiving unit and distinguishing modes of each signal; an image control unit for executing the operation according to a button signal including in the button signal mode, when the mode distinguished by the signal control unit is a button signal mode; and a GUI control unit for displaying a main manual and a pointer on the screen in a GUI environment, and controlling the pointer according to a touch pad operation of the viewer, when the mode distinguished by the signal control unit is a touch pad signal mode, wherein the pointer is moved corresponding to be moved from a reference position of the touch pad.

The GUI control unit performs the control operation to recognize characters which the viewer inputs to the touch pad and to search information corresponding to the characters.

The remote control means varies the previously-set button signal mode into the touch pad signal mode and enables the touch pad control unit, when the viewer selects a menu button key among the button keys.

According to another aspect of the invention, a remote controller for remotely controlling a digital television includes: a button unit having a plurality of button keys including a menu button key for enabling a touch pad at its one side; the touch pad installed at the other side of the button unit, and contacted by a viewer for executing menu selection information displayed on the digital television, a button key control unit for varying a previously-set button signal mode into a touch pad signal mode according to a menu button key operation of the viewer, a touch pad control unit for generating a touch control signal including a movement position signal and a menu selection signal according to a touch pad contact of the viewer; and a signal transmitting unit for remotely transmitting the touch pad signal mode from the button key control unit or the touch control signal from the touch pad control unit to the digital television.

Additional advantaged, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a remote control method having a GUI function and a system using the same according to a preferred embodiment of the invention in reference to the accompanying drawings.

Figure 1:
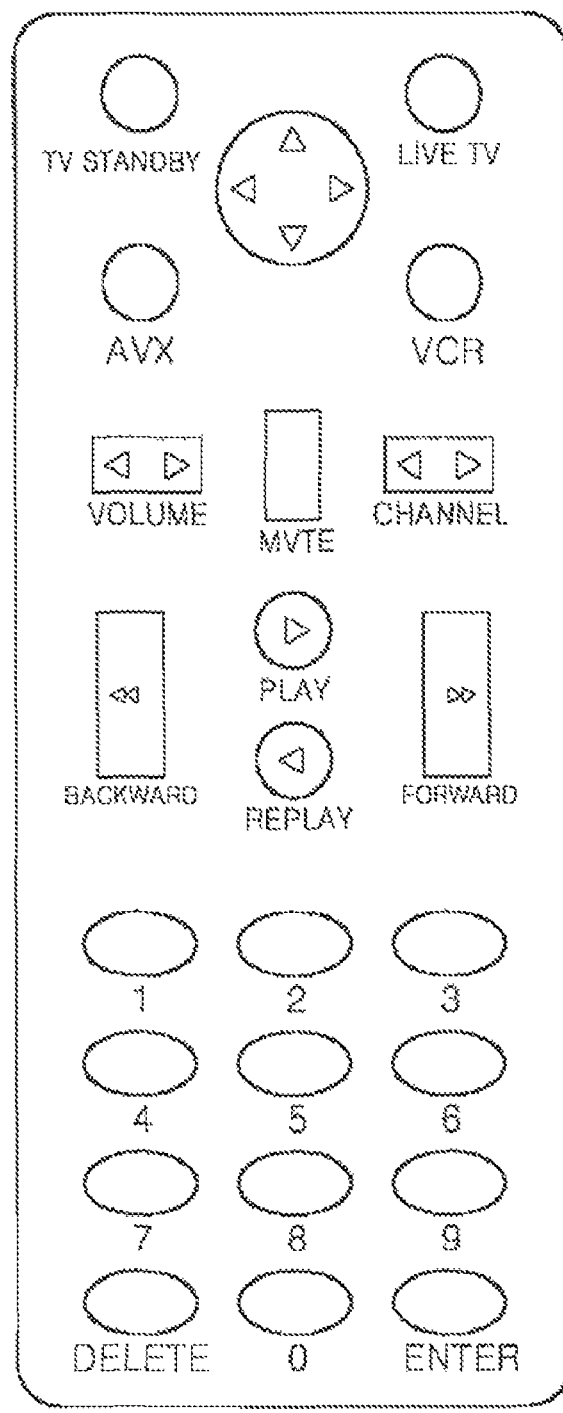
FIG. 1 illustrates a conventional remote controller.
Figure 2:
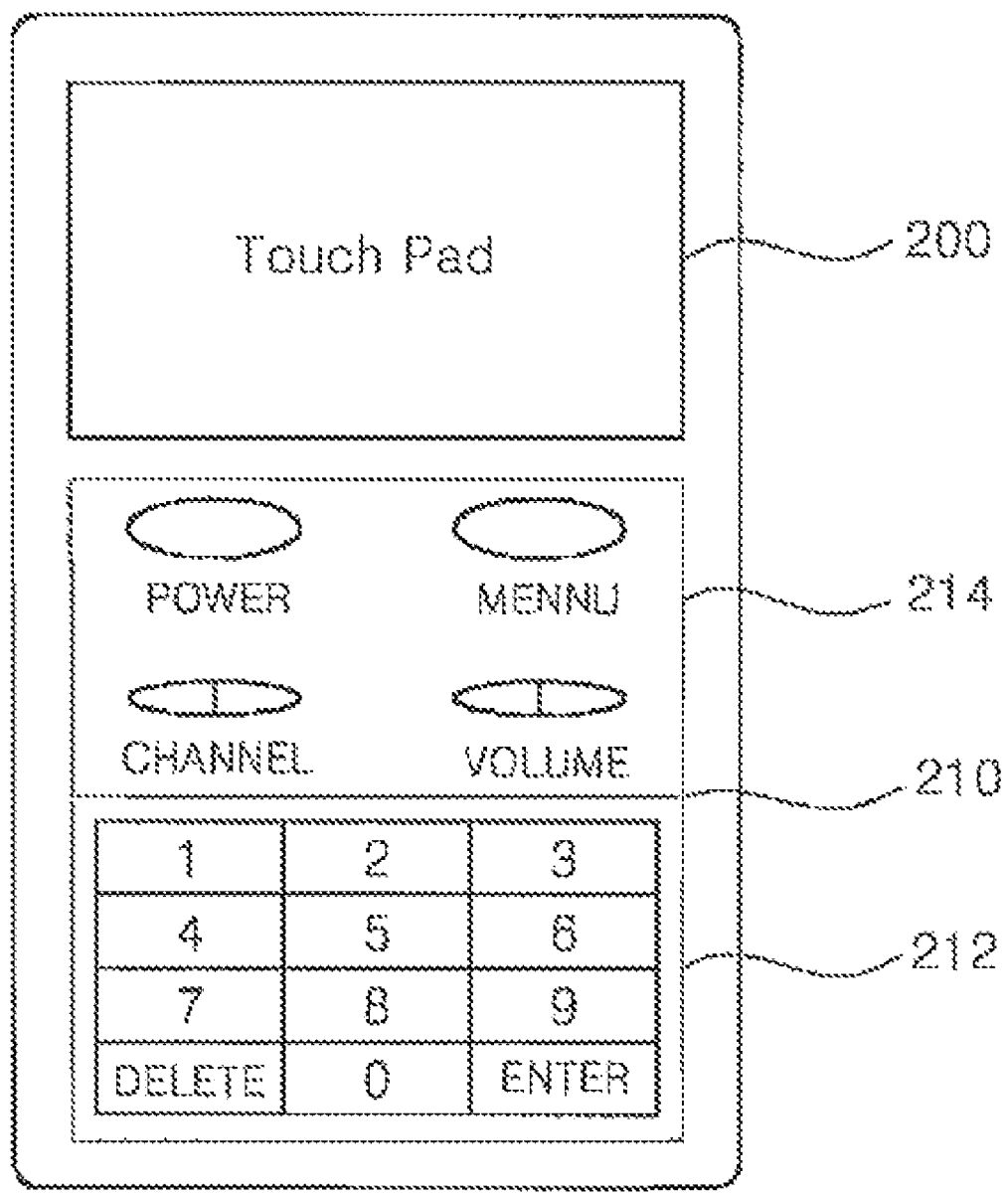
FIG. 2 illustrates a remote controller having a touch pad in accordance with a preferred embodiment of the present invention.
Figure 3:
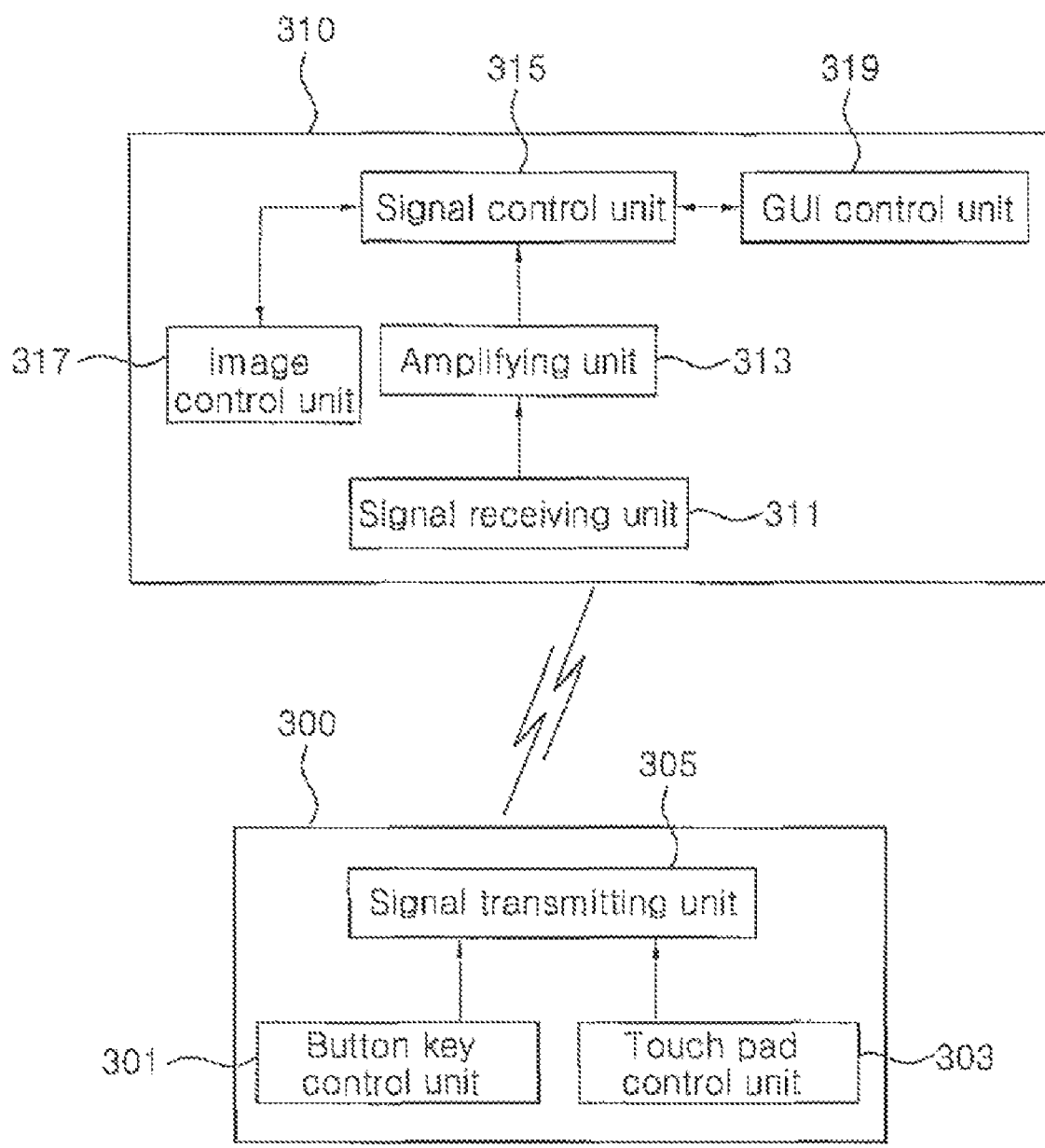
FIG. 3 is a structure view illustrating a remote control system which embodies a graphic user interface in accordance with the preferred embodiment of the present invention.

FIG. 2 illustrates a remote controller having a touch pad in accordance with the preferred embodiment of the present invention. FIG. 2 shows an external appearance of the remote controller and FIG. 3 shows detailed additional hardware. As shown in FIG. 2, the remote controller includes a touch pad 200 for generating a touch control signal by a contact of a viewer at its one side, and a button unit 210 having a plurality of menu keys 214 and number keys 212 at the other side. Here, the plurality of menu keys 214 include basic keys such as a POWER button key, a MENU button key, CHANNEL button key and a VOLUME button key. Among the plurality of menu key 214, the MENU button key is used to vary a previously-set button signal mode into a touch pad signal mode for enabling the touch pad 200. That is, when the viewer presses the MENU button key, the button signal mode previously set up as 'DEFAULT' for performing operations of the basic keys is varied into the touch pad signal mode. Accordingly, the viewer can control all the functions of the digital television in a GUI environment by using the touch pad 200 of the remote controller, except for the basic keys.

The viewer can input wanted characters or control commands to the touch pad 200 by using a finger or stylus. Here, a method for inputting the characters to the touch pad 200 is embodied by preparing a function of recognizing a writing style of the viewer. The method for inputting the characters to the touch pad 200 has been publicly known, and thus explanations thereof are omitted.

The touch control signal generated by the contact of the viewer is divided into a movement position signal and a menu selection signal. The movement position signal shows movement distance/direction information of a pointer generated when the viewer moves by a predetermined distance in a state where he/she maintains a first contact position to the touch pad 200. The menu selection signal is generated when the viewer maintains the first contact position to the touch pad 200 over a predetermined time, or when he/she continuously contacts the first contact position to the touch pad 200.

As explained above, the button unit 210 is composed of the plurality of menu keys 214 and number keys 212. The plurality of menu keys 214 include only menus for executing control operations by one button key press. Such menus are basic button keys for controlling the digital television (310 of FIG. 3), for example, the POWER button key, the MENU button key, the CHANNEL button key and the VOLUME button key. The number keys 212 include commands for controlling the digital television instead of the menu keys, so that the viewer can control the digital television by using specific number keys.

FIG. 3 is a structure view illustrating the remote control system which embodies a graphic user interface in accordance with the preferred embodiment of the present invention. As illustrated in FIG. 3, the remote control system includes a remote controller 300, and a digital television 310 for remotely receiving a control signal from the remote controller 300, performing a corresponding control operation and displaying the result on the screen in the GUI environment. Here, the digital television 310 is exemplified, but any kind of means for displaying the result on the screen in the GUI environment according to the control signal from the remote controller 300 can be employed.

The remote controller 300 includes a button key control unit 301, a touch pad control unit 303 and a signal transmitting unit 305.

The button key control unit 301 generates a button signal in response to a press of the plurality of menu keys 214 and number keys 212 included in the button unit 210 as shown in FIG. 2. When the MENU button key of the menu keys 214 is pressed, the button key control unit 301 varies the previously-set button signal mode into the touch pad signal mode, and transmits it to the digital television 310 through the signal transmitting unit 305, thereby controlling the mode selection information including the main manual and pointer to be displayed on the screen in the GUI environment. When the mode is varied into the touch pad signal mode, the touch pad control unit 303 is enabled to recognize the contact to the touch pad 200.

When the viewer contacts the touch pad 200, the touch pad control unit 303 recognizes the contact and generates the corresponding touch control signal. As explained above, the touch control signal includes the movement position signal for moving the pointer in the menu selection information displayed on the screen of the digital television 310, and the menu selection signal for selecting a specific menu among the plurality of menus existing in the main manual of the menu selection information.

That is, when the viewer contacts a point of the touch pad 200, the touch pad control unit 303 recognizes the position as a reference position (X, Y) of the pointer. When the viewer maintains the current contact position, moves by a predetermined distance and stops in a certain position, the touch pad control unit 303 recognizes the stop position as a final movement position (X', Y'). The touch pad control unit 303 generates the movement position signal showing the movement distance and direction information by using the reference position and the final movement position. The pointer displayed on the screen of the digital television 310 is moved according to the movement position signal.

When the pointer displayed on the screen of the digital television 310 is positioned on the specific menu, if the viewer intends to select the specific menu, the viewer maintains the contact state in one position of the touch pad 200 over a predetermined time, or continuously contacts one position of the touch pad 200. Accordingly, the touch pad control unit 303 recognizes it as a signal for selecting the specific menu, generates the menu selection signal, and controls the specific menu to be executed on the digital television 310.

The digital television 310 includes a signal receiving unit 311, an amplifying unit 313, a signal control unit 315, an image control unit 317 and a GUI control unit 319.

The signal receiving unit 311 receives the control signal from the remote controller 300, such as the touch pad signal mode, button signal and touch control signal, and the amplifying unit 313 amplifies the control signal.

The signal control unit 315 distinguishes the signal mode on the basis of the control signal amplified in the amplifying unit 313. That is, the signal control unit 315 confirms whether the control signal is the button signal mode or touch pad signal mode. Since the button signal mode is generally set up in DEFAULT, the signal control unit 315 only confirms whether the mode is the touch pad signal mode. In order to use the touch pad 200, the viewer should operate the MENU button key of the button unit 210 of the remote controller 300. Accordingly, the button signal mode is varied into the touch pad signal mode, and the menu selection information is displayed on the screen by the signal control unit 315 in the GUI environment through the GUI control unit 319.

When the control signal inputted to the signal control unit 315 is the button signal mode, the control signal is inputted to the image control unit 317, for turning on/off power, changing a channel, or adjusting a volume.

Conversely, when the control signal is the touch pad signal mode, the control signal is inputted to the GUI control unit 319 by the signal control unit 315, and the control operation such as pointer movement, specific menu selection or character search is executed according to the control signal. When the viewer inputs a wanted writing style to the touch pad 200 by contact, the remote controller 300 recognizes the writing style, generates the touch control signal, and transmits it to the GUI control unit 319 to display characters.

Figure 4:
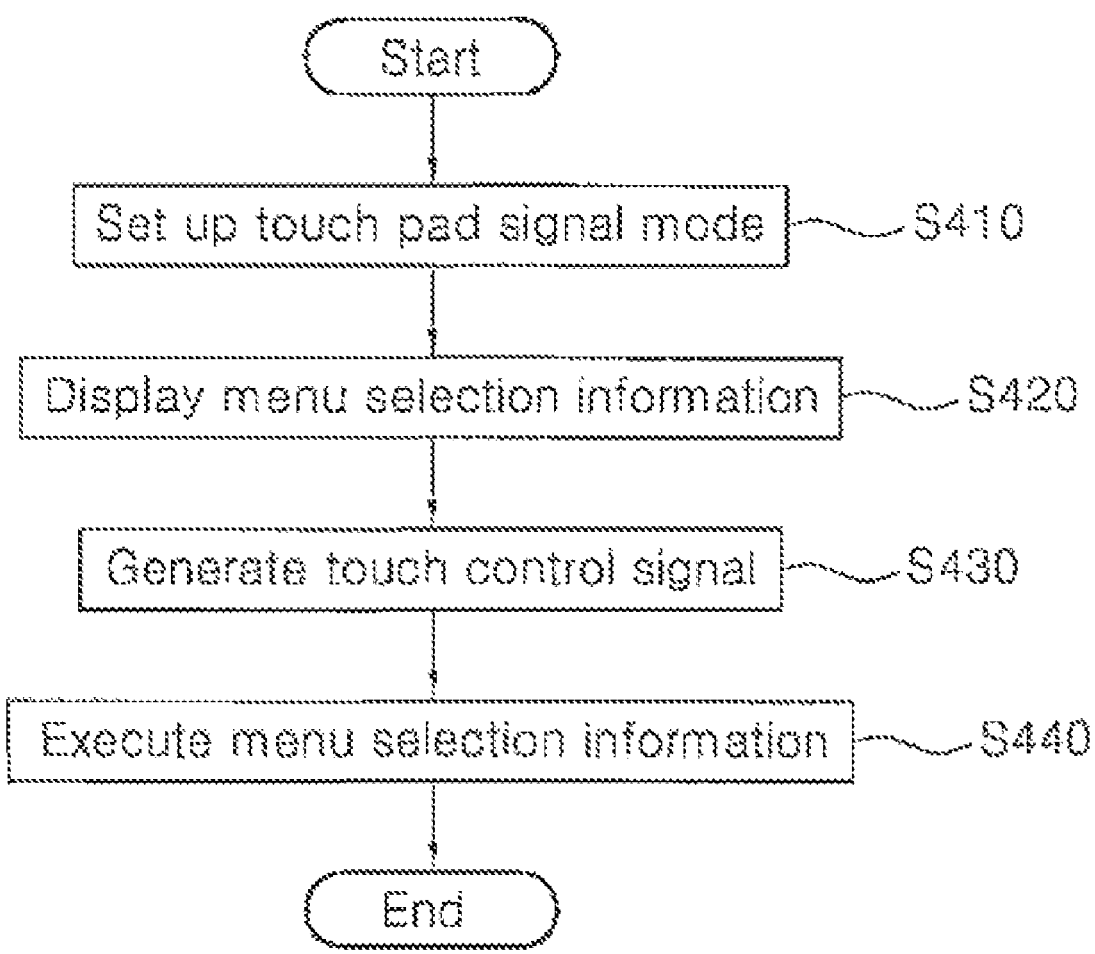
FIG. 4 is a flowchart showing a remote control method which embodies the graphic user interface in accordance with the preferred embodiment of the present invention.

FIG. 4 is a flowchart showing the remote control method which embodies the graphic user interface in accordance with the preferred embodiment of the present invention. As shown in FIG. 4, when the viewer intends to use a variety of menu functions of the digital television 310 in tie GUI environment by using the touch pad 200 of the remote controller 300, the viewer presses the MENU button key included in the button unit 210 of the remote controller 300. The previously-set button signal mode is varied into the touch pad signal mode by the MENU button key press of the viewer, thereby enabling the touch pad control unit 303 (S410). Or, each of control operation of the digital television (310) can be directly executed when the viewer touches one of menu keys displayed on the touch pad (200) without varying into the touch pad signal mode.

In addition, the remote controller 300 transmits the varied touch pad signal mode to the digital television 310, and the digital television 310 displays the menu selection information on the screen in the GUI environment in response to the touch pad signal mode (S420). Here, the menu selection information is preferably displayed in a window type.

Figure 5:
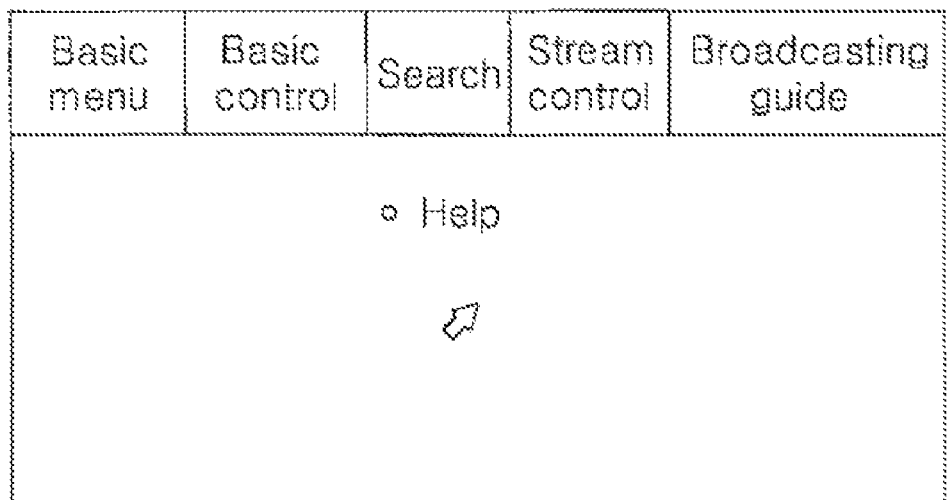
FIG. 5 shows a main picture for control by the touch pad in accordance with the preferred embodiment of the present invention.

As shown in FIG. 5, the menu selection information is composed of the main manual selected by the viewer, and a pointer for selecting and executing a specific menu in the main manual. That is, the main manual includes a basic menu, a basic control menu, a search menu, a stream control menu, a broadcasting guide menu and a help menu. The basic menu may include sub menus such as a channel setup menu for setting up a channel, an image menu for adjusting brightness and contrast to protect eyes of the viewer, and a period control menu.

the basic control menu may include sub menus such as a bedtime reservation menu for turning off the digital television 310 after a setup time, and a format menu for formatting the HDD.

Figure 6:
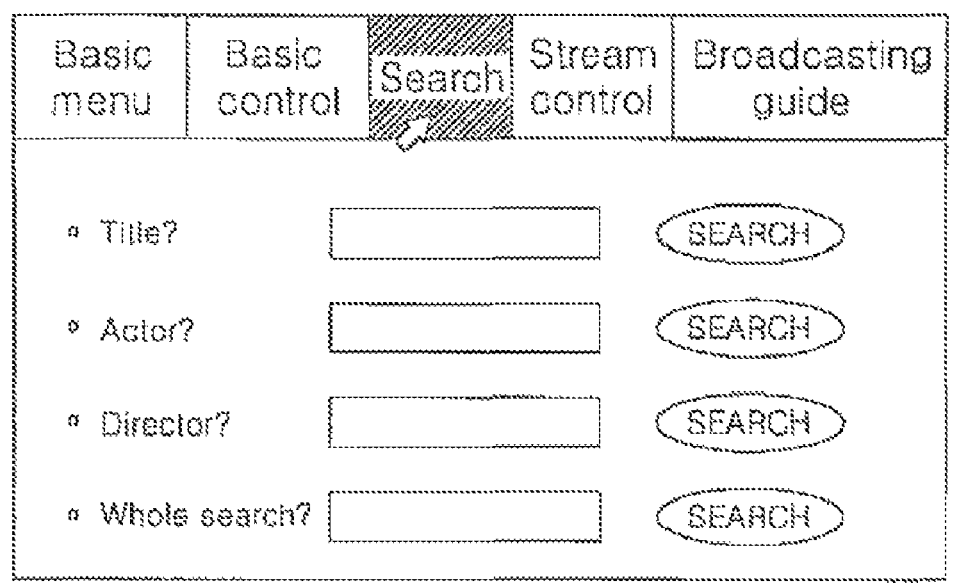
FIG. 6 shows a picture for selecting a search menu in the main picture of FIG. 5.

As depicted in FIG. 6, the search menu has input windows for a broadcasting program title, main actor, director and whole search. Accordingly, when the viewer selects the search menu by using the touch pad 200 of the remote controller 300, inputs wanted characters to each input window, and selects "SEARCH" by moving the pointer, the image display means searches a broadcasting program satisfying the conditions input by the viewer among the broadcasting programs stored in the built-in HDD.

As explained above, the viewer inputs characters by using the touch pad 200 and displays the result on the digital television 310. Such a character input method has been used for a personal digital assistant (PDA). When the characters input by the viewer through the touch pad 200 are patternized and transmitted to the digital television 310, the GUI control unit 319 of the digital television 310 restores the patternized signals into characters and displays them in the corresponding position of the screen.

Figures 7, 8:
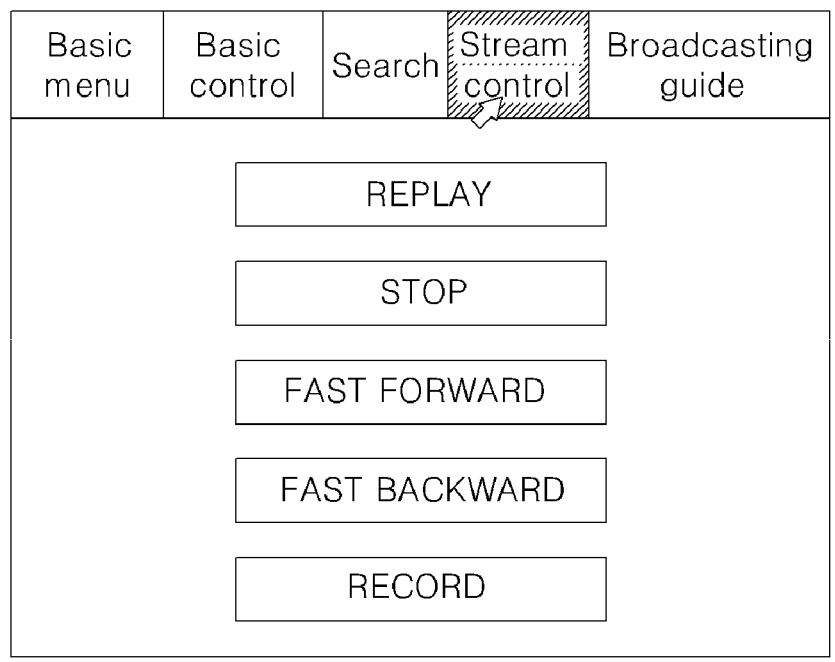
FIG. 7 shows a picture for selecting a stream control menu in the main picture of FIG. 5.
FIG. 8 shows a picture for selecting a broadcasting guide menu in the main picture of FIG. 5.

Referring to FIG. 7, the stream control menu may include a replay menu, a stop menu for capturing a specific scene, a fast forward menu for fast playing the program, a fast backward menu for rewinding the program, and a record menu for recording a specific scene.

As shown in FIG. 8, the broadcasting guide menu may include information on a real-time broadcasting program provided by an EPD database built by a broadcasting program service company.

As illustrated in FIGS. 5 to 8, the viewer can select and execute a wanted menu or sub menu by moving the pointer displayed on the digital television 310 by using the touch pad 200 of the remote controller 300.

Still referring to FIG. 4, when the viewer displays the menu selection information on the screen in the GUI environment by using the MENU button key of the button unit 210 of the remote controller 300, the viewer can select a wanted menu in the menu selection information by using the touch pad 200 of the remote control 300. That is, in order to move the pointer, when the viewer moves by a predetermined distance in a state where he/she maintains a contact state in one position of the touch pad 200, the remote controller 300 calculates the movement distance and direction information from the touch pad 200, and generates the movement position signal.

So as to select a specific menu in the menu selection information displayed on the digital television 310, when the viewer maintains a contact state in one position of the touch pad 200 over a predetermined time or continuously contacts it, the remote controller 300 recognizes the contact state by the viewer on the touch pad 200, and generates the menu selection signal.

As a result, the remote controller 300 transmits the touch control signal including the movement position signal and/or menu selection signal generated by the contact of the viewer to the touch pad 200 to the digital television 310 through the signal transmitting unit 305 (S430).

The digital television 310 executes the menu selection information according to the touch control signal from the remote controller 300 (S440). That is, when the touch control signal is the movement position signal, the digital television 310 moves the pointer displayed on the screen in response to the movement position signal. In addition, when the touch control signal is the menu selection signal, the digital television 310 selects and executes a specific menu at the same time in response to the menu selection signal.

As discussed earlier, in accordance with the present invention, in a variety of functions which have been controlled by the button keys of the general remote controller, the functions except for the basic functions can be controlled by the main manual and pointer provided in the GUI environment. That is, it is possible to easily control various functions of the digital television by simple operations of the remote controller.

Moreover, the remote controller can be embodied without using the plurality of button keys, which removes complexity and improves convenience.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for remotely controlling a graphic user interface (GUI) on a display screen, the method comprising:
    displaying a pointer on the display screen in response to a user interacting with a remote control device wirelessly communicating with a GUI controller of the display screen;
    selecting an option from a GUI menu displayed on the display screen in response to the user interacting with the remote control device, wherein the user controls a location of the pointer on the display screen by interacting with the touch pad; and
    receiving a control operation signal in response to the user interacting with at least one menu item displayed on a touch pad of the remote control device, wherein the method further comprises:
    switching between a button mode and a touch screen mode when a menu key button is selected on the remote control device, and
    executing a function on the display screen when one of the menu items displayed on the touch pad of the remote control device is selected, the menu item displayed on the touch pad selected in the button mode and the function being performed on the display screen while the remote control device is in button mode without switching into the touch screen mode.

2. A method for remotely communicating with a display screen, the method comprising:
    controlling a GUI displayed on the display screen in response to an operation of a remote control device;
    receiving a control operation signal in response to selection of at least one menu item displayed on a touch pad of the remote control device; and
    selecting an object displayed on the display screen in response to the received control operation signal, wherein the method further comprises:
    switching between a button mode and a touch screen mode when a menu key button is selected on the remote control device, and
    executing a function on the display screen when the menu item displayed on the touch pad of the remote control device is selected, the menu item displayed on the touch pad selected in the button mode and the function being performed on the display screen while the remote control device is in button mode without switching into the touch screen mode.

3. The method of claim 2, wherein the remote control device includes a plurality of button keys below the touch pad such that the plurality of button keys are closer to the user than the touch pad when the remote control device is held by the user to control the operation of the display screen.

4. The method of claim 3, wherein the plurality of button keys includes a plurality of numerical key buttons.

5. The method of claim 3, wherein the plurality of button keys includes a volume up button and a volume down button.

6. The method of claim 3, wherein the plurality of button keys includes a channel up button and a channel down button.

7. The method of claim 3, wherein the plurality of button keys includes a power button key and a menu button key.

8. The method of claim 3, wherein the plurality of button keys include one of a menu button key and a power button key and at least one of numeric key buttons, volume up and down key buttons, or a channel up and down button keys.

9. The method of claim 2, wherein the touch pad is provided on a front of the remote control device, and no key buttons are provided with the touch pad on the front of the remote control device.

10. A method of controlling a display device using a remote controller comprising:

displaying a plurality of menu items on a touch pad of a remote controller;

transmitting a first wireless signal corresponding to a selection of at least one menu item on the touch pad to a display device;

controlling a first operation corresponding to the selected menu item of the display device when the first wireless signal is received by the display device;

transmitting a second wireless signal corresponding to a selection of at least one key button on the remote controller to the display device; and controlling a second operation corresponding to the selected key button of the display device when the second wireless signal is received by the display device, wherein at least one key button allows control of volume or control of channel displayed on the display device, and wherein the method further comprises:

switching between a button mode and a touch screen mode when a menu key button is selected on the remote controller, and executing a function of the display device when one of the menu items displayed on the touch pad of the remote controller is selected, the menu item displayed on the touch pad selected in the button mode and the display device function being performed while the remote controller is in button mode without switching into the touch screen mode.

11. A method of operating a remote controller for a display device, the method comprising:

displaying a plurality of menu items on a touch pad of the remote controller;

generating a first signal corresponding to a selection of at least one menu item on the touch pad;

transmitting a first wireless signal based on the first signal;

generating a second signal corresponding to a selection of at least one key button on the remote controller; and generating a second wireless signal based on the second signal, wherein the touch pad is provided above the at least one key button, the at least one key button on the remote controller corresponds to one of volume up and down button or channel up and down button, and wherein the method further comprises:

switching between a button mode and a touch screen mode when a menu key button is selected on the remote controller, selecting one of the menu items displayed on the touch pad of the remote controller in the button mode, and transmitting a signal in response to said selection, the signal being transmitted in button mode without switching into the touch screen mode.

12. The method of claim 11, wherein the at least one key button is provided only below the touch pad.

13. The method of claim 11, wherein the plurality of menu items displayed on the touch pad comprises fast forward, fast backward and stop menu items displayed on the touch pad.

14. The method of claim 11, wherein the plurality of menu items displayed on the touch pad comprises basic menu item and broadcast guide menu item.

15. The method of claim 11, wherein the plurality of menu items displayed on the touch pad comprises basic control menu item and guide menu item.

16. The method of claim 11, wherein the plurality of menu items displayed on the touch pad comprises search menu item and guide menu item.

17. The method of claim 11, wherein the at least one key button on the remote controller further includes numerical key buttons.

18. The method of claim 11, wherein the at least one key button on the remote controller further comprises at least one of menu key button or power key button.

* * * * *